Oct. 28, 1930.  I. LANGSTON  1,779,477
CORE BAR GAUGE
Filed Sept. 2, 1927   2 Sheets-Sheet 1

INVENTOR
Ira Langston,
BY
*Siggers & Adams,*
ATTORNEYS

Oct. 28, 1930.  I. LANGSTON  1,779,477
CORE BAR GAUGE
Filed Sept. 2, 1927  2 Sheets-Sheet 2
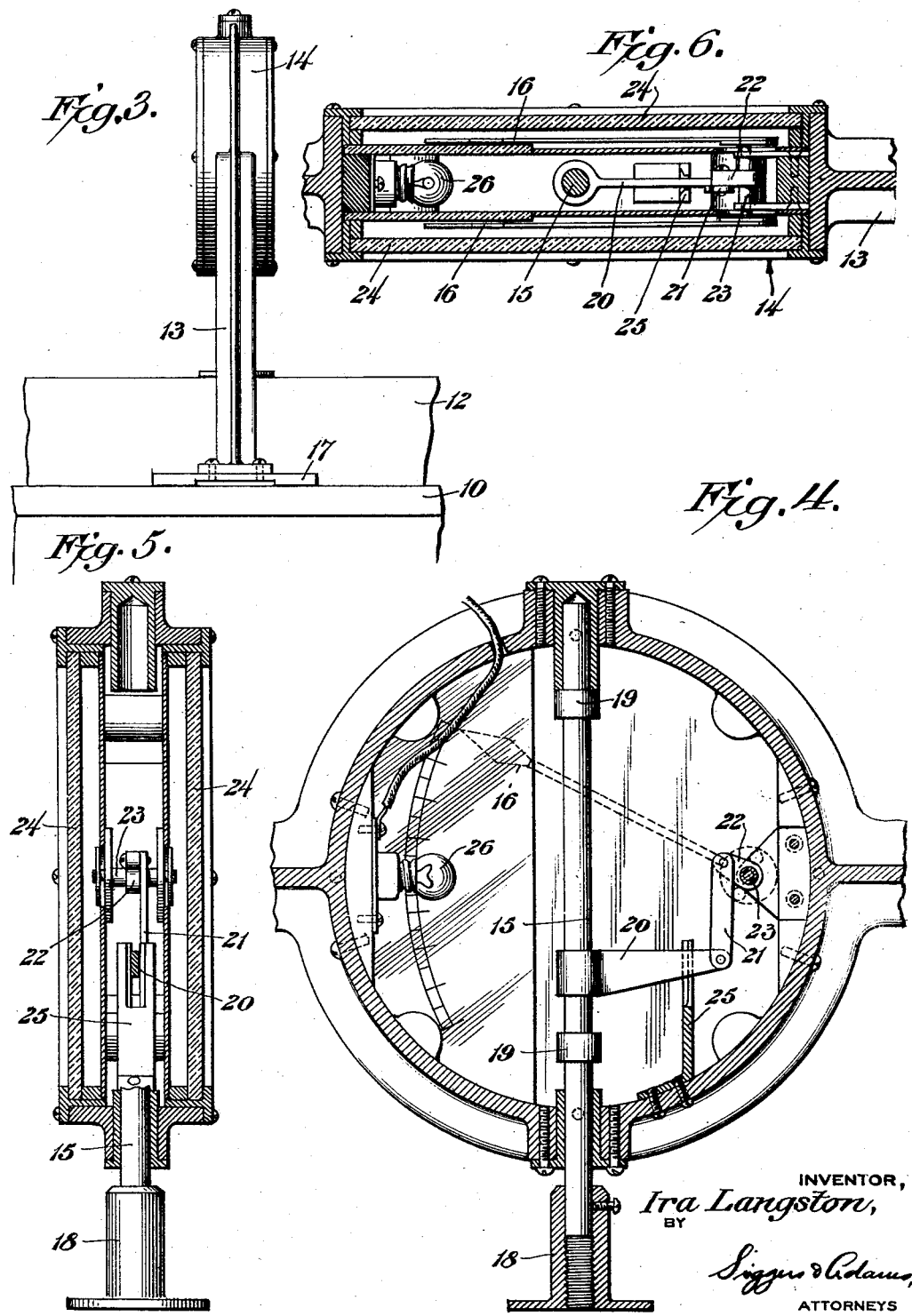
INVENTOR,
Ira Langston,
BY
ATTORNEYS Patented Oct. 28, 1930

1,779,477

UNITED STATES PATENT OFFICE

IRA LANGSTON, OF BIRMINGHAM, ALABAMA, ASSIGNOR TO McWANE CAST IRON PIPE COMPANY, OF BIRMINGHAM, ALABAMA, A CORPORATION OF ALABAMA

CORE-BAR GAUGE

Application filed September 2, 1927. Serial No. 217,236.

This invention relates to gauges, and aims to provide an accurate, easily read and serviceable gauge which is useful in reading the amount of deflection from true concentricity of a core when supported on the drag section of a flask.

The invention is particularly designed for use with apparatus of the character described in the James R. McWane Reissue No. 17,121, but it will be obvious that the invention has other uses.

In the accompanying drawings showing a preferred embodiment of the invention,

Fig. 3 is a side elevation of the same, only a small part of the drag being shown;

Fig. 4 is a vertical section on an enlarged scale through one of the dial cases of the gauge;

Fig. 5 is a similar view, but at right angles to Fig. 4; and

Fig. 6 is a horizontal diametric section through one of the dial cases.

As set forth in the McWane Reissue No. 17,121, it is highly desirable to support the core bars within pipe flasks and the like so that the core bars are not strictly coaxial with the spaces in the flasks, but are flexed downwardly in the middle a small fraction of an inch, so that the lifting effect of the molten metal, when poured into the flasks, brings the core bars to the center position, thus producing castings having walls of substantially uniform thickness. As the pipes usually are sixteen feet long, a small deflection of the core bars cannot be measured by the eye and can scarcely be seen; hence there is a genuine need for a measuring instrument which will stand the rough usage of the foundrymen and will indicate clearly and accurately the amount of deflection of the core bars, thereby permitting the foundrymen to change the deflection, if too little or too large, before the metal is poured, as by the means described in said McWane patent. The present invention meets this need.

Referring more specifically to the drawings, there is shown a drag 10 on which two core bars 11 are supported (as in said McWane patent), the core bars having sand cores 12 formed on them as is customary.

Figure 1:
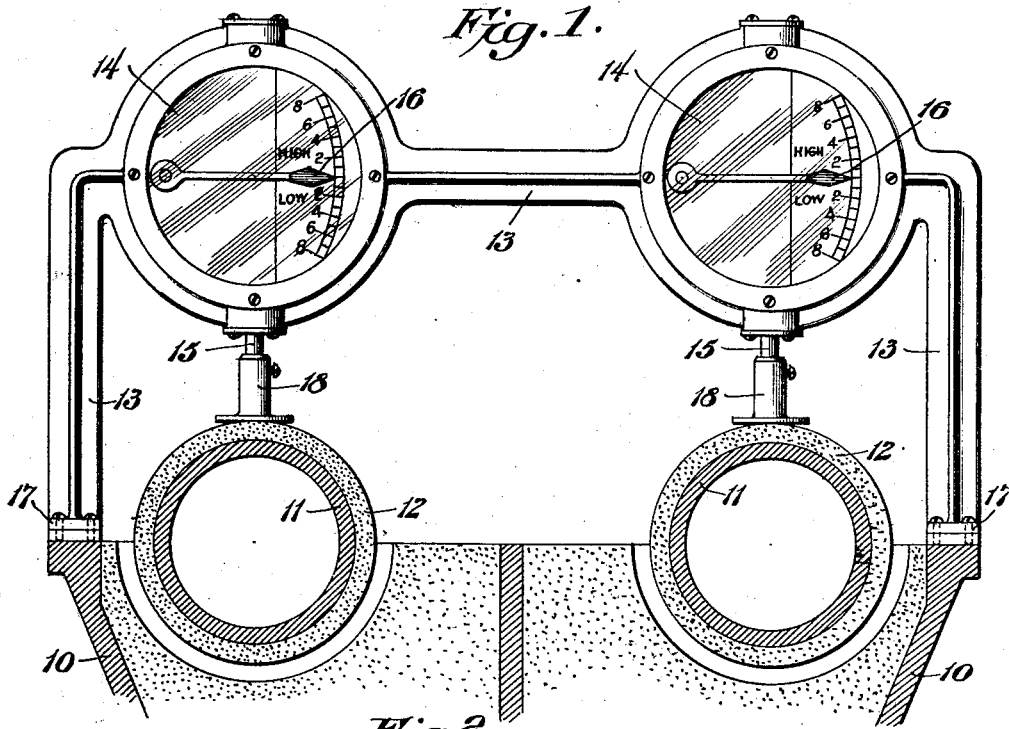
Fig. 1 is an elevation of the gauge shown supported on a drag for casting pipe and contacting with two cores so as to measure the amount of deflection of the cores.
Figure 2:
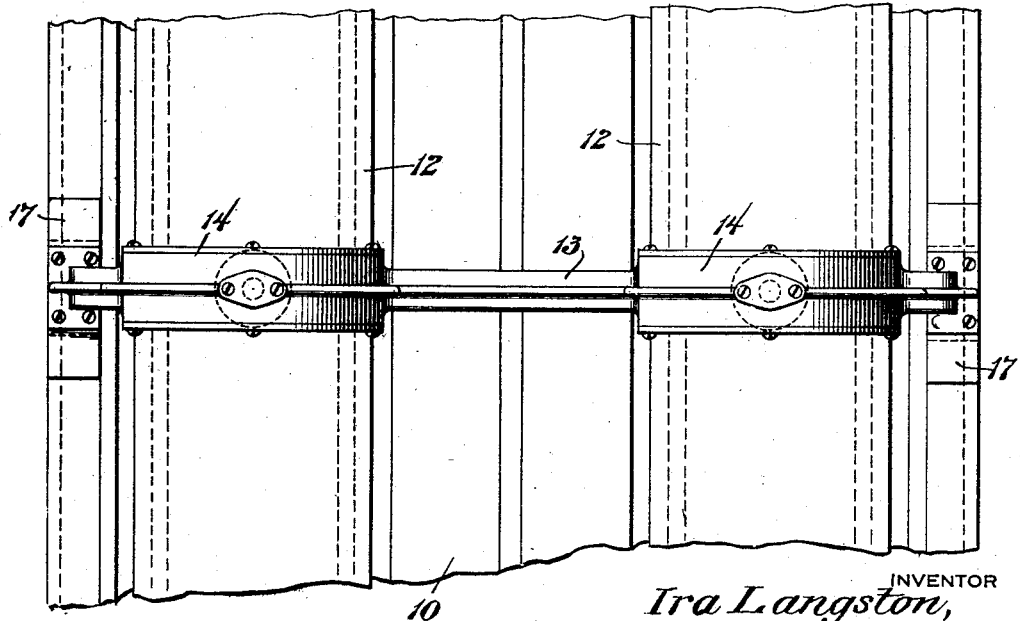
Fig. 2 is a plan view of the same.

Constructed to span the drag and rest on the metal edges thereof is a gauge comprising generally a frame 13, two dials 14, and members 15 constructed and arranged to contact with the tops of the cores, as shown in Fig. 1, thus moving the indicator hands 16 commensurate with the extent of movement of the members 15. There will be two dials only when there are two core bars whose deflections are to be measured simultaneously. Usually, the number of dials equals the number of core bars, and preferably the dials are spaced apart, center to center, the same distance as the core bars, center to center.

To insure accurate reading of the gauge, the frame 13 has two vertical legs of exactly the same length, with feet 17 of sufficient size to provide a stable base for the gauge even when placed hastily on the drag, as in the hurry of a plant of large production. The cores are supported to lie so that, at their mid points, there is a deflection of a small fraction of an inch below a true horizontal line. The length of the members 15 and the arrangement of the indicators 16 is such that when the proper deflection exists in each case, the indicators will read zero, and any deflection other than the correct one will be magnified by a series of links within the dials and by the indicator hands themselves and will be immediately observable, preferably from each end of the flask. The foundrymen may then tighten or loosen the deflection-causing elements until the gauge over each core reads correctly, or within the desired maximum and minimum limits.

The exact construction of the linkage which magnifies movement of the members 15 is of minor importance, as many different mechanisms may be used. The mechanism shown in Figs. 4, 5 and 6 has been selected because of its reliability under the severe usage which the gauges receive.

Referring to said figures, the member 15 is seen to consist of a straight rod slidably mounted within the dial case 14 and extending diametrically therethrough, with a removable foot member 18 which is adjustable as shown in Fig. 4, permitting outside adjustment of the instrument to correct any errors which may develop. Stops 19 fixed on the rod limit movement in each direction, preventing injury to the delicately mounted indicator hand. Secured to the rod 15 and extending therefrom at right angles is a straight arm 20, to the outer end of which is pivoted a connecting link 21, the other end of which is pivoted to a short crank arm 22 secured to an arbor 23 on which the indicator hand is mounted. It will be clear that the arm 20, link 21 and crank arm 22 together provide a series of links or a linkage connecting each rod 15 with an indicator hand 16.

For convenience, there are two indicator hands 16 on the arbor, one movable over each face of the dail, which is appropriately graduated as shown, and protected by transparent crystals 24 secured as shown. A guide 25 bifurcated at its upper end may be provided for arm 20, preventing turning of said arm and the resultant strain on the pivots.

On dark days and when working against bright lights, it may be desirable to illuminate the interiors of the dials. For this purpose, a small bulb 26 may be mounted within each dial and may be illuminated either automatically by means (not shown) actuated by positioning the gauge, or by a small hand operated switch in a conductor connected with a source of current, as a battery (not shown).

In the drawings, as two core bars are shown, two dials are provided on the gauge, one for each core bar. It will be clear that there should be as many indicators as there are core bars, or other articles whose relative position is to be measured or indicated.

Obviously the present invention is not restricted to the particular embodiment thereof herein shown and described. Moreover, it is not indispensable that all the features of the invention be used conjointly, since they may be employed advantageously in various combinations and subcombinations.

What I claim is:—

1. A device of the character described comprising, in combination, a frame constructed and arranged to span a drag transversely and rest directly on the top edges thereof; a dial secured to the frame; an indicator hand movable over the face of said dial; a foot piece for contacting with the top of a core; a slidable rod secured to the foot piece; an arbor rotatably mounted on the dial; an arm secured at one end to the rod; a link pivoted to the outer end of said arm; a crank arm secured to the arbor and pivotally connected with said link; the indicator hand being carried by the arbor; and a fixed guide secured to the dial for preventing turning of said arm.

2. A gauge for measuring the amount of deflection of core bars when seated upon flasks comprising, in combination, a rigid frame consisting of two legs of equal length and a connecting bar; a plurality of dials mounted on the connecting bar and spaced apart center to center substantially the same distance as the center to center spacing of the core bars; and mechanism carried by each dial and comprising a foot member adapted to rest upon a core; an indicator hand; and means connecting the foot member and the indicator hand so as greatly to magnify the movement of the foot member; the parts being so arranged that the weight of the gauge is utilized to move the indicator hands when the foot members come in contact with the tops of the cores.

In testimony, that I claim the foregoing as my own, I have hereto affixed my signature.

IRA LANGSTON.